(12) United States Patent
Cailleton (10) Patent No.: US 12,262,838 B2
(45) Date of Patent: Apr. 1, 2025

(54) MANUAL PRESSURE TYPE COFFEE MAKER

(71) Applicant: HUA KU (SHUNDE) TECH ELECTRIC CO., LTD., Foshan (CN)

(72) Inventor: Hugo Yves Lucien Cailleton, Foshan (CN)

(73) Assignee: HUA KU (SHUNDE) TECH ELECTRIC CO., LTD., Foshan (CN)

( * ) Notice: Subject to any disclaimer, the term of this patent is extended or adjusted under 35 U.S.C. 154(b) by 955 days.

(21) Appl. No.: 17/416,992

(22) PCT Filed: Oct. 8, 2019

(86) PCT No.: PCT/CN2019/109903
§ 371 (c)(1),
(2) Date: Aug. 30, 2021

(87) PCT Pub. No.: WO2020/125137
PCT Pub. Date: Jun. 25, 2020

(65) Prior Publication Data
US 2022/0053965 A1     Feb. 24, 2022

(30) Foreign Application Priority Data

Dec. 20, 2018 (CN) .......................... 201811567072.9
Sep. 26, 2019 (CN) .......................... 201910918946.9

(51) Int. Cl.
*A47J 31/20* (2006.01)
*A47J 31/00* (2006.01)
*A47J 31/06* (2006.01)

(52) U.S. Cl.
CPC ............. *A47J 31/20* (2013.01); *A47J 31/005* (2013.01); *A47J 31/0663* (2013.01)

(58) Field of Classification Search
CPC ....... A47J 31/20; A47J 31/005; A47J 31/0663
(Continued)

(56) References Cited

U.S. PATENT DOCUMENTS 7,467,718 B1 * 12/2008 Donohue ................ A47J 43/24
                                                                 210/473
7,849,784 B2 * 12/2010 Adler ...................... A47J 31/02
                                                                   99/287
(Continued)

FOREIGN PATENT DOCUMENTS

CN      201197624 Y     2/2009
CN      201243955 Y     5/2009
(Continued)

OTHER PUBLICATIONS

Dec. 27, 2019 Search Report issued in International Patent Application No. PCT/CN2019/109903.
(Continued)

*Primary Examiner* — Jimmy Chou (57) ABSTRACT

A manual pressure type coffee maker includes an outer cup body, the outer cup body is provided with a cup cavity with an open end, and with an inner container that can be inserted into and pulled out of the cup cavity from the open end, the technical points are the inner container is provided with an inner container cavity for containing brewing materials, the inner container is provided with a sealing ring that separates the cup cavity to form a closed space, and a bottom of the inner container cavity is provided with a filter communicated with the closed space, when the inner container is pulled outwards, negative pressure is formed in the closed space so that liquid in the inner container cavity is sucked into the closed space through the filter. The invention can brew coffee by negative pressure with a simple structure.

18 Claims, 12 Drawing Sheets

(58) Field of Classification Search
USPC .......................................................... 99/287
See application file for complete search history.

(56) References Cited

U.S. PATENT DOCUMENTS

| | | | | |
|---|---|---|---|---|
| 8,234,971 | B2* | 8/2012 | Cerroni | A47J 31/38 |
| | | | | 99/287 |
| 9,510,705 | B2* | 12/2016 | Rolfes | A47J 31/38 |
| 9,591,942 | B2* | 3/2017 | Chiu | A47J 31/005 |
| 10,448,779 | B2* | 10/2019 | Kalbfleisch | A47J 31/20 |
| 10,531,763 | B1* | 1/2020 | Backstrom | A47J 31/446 |
| 10,820,605 | B2* | 11/2020 | Shaw | A23F 3/18 |
| 11,330,930 | B2* | 5/2022 | Pranckun | A47J 31/043 |
| 11,497,343 | B2* | 11/2022 | Kuempel | A47J 31/0605 |
| 2003/0070979 | A1* | 4/2003 | Huang | A47J 31/20 |
| | | | | 99/279 |
| 2010/0116143 | A1 | 5/2010 | Cerroni | |
| 2010/0224078 | A1* | 9/2010 | Khalifa | A47J 31/20 |
| | | | | 99/323 |
| 2011/0083560 | A1 | 4/2011 | Chen | |
| 2013/0186280 | A1* | 7/2013 | Sekiguchi | A47J 31/005 |
| | | | | 99/287 |
| 2013/0186281 | A1* | 7/2013 | Guo | A47J 31/3666 |
| | | | | 99/287 |
| 2013/0233177 | A1* | 9/2013 | Lambert | A47J 31/407 |
| | | | | 99/295 |
| 2013/0233178 | A1* | 9/2013 | Herling | A47J 31/18 |
| | | | | 99/322 |
| 2015/0190768 | A1* | 7/2015 | Li | B01F 23/2362 |
| | | | | 99/466 |
| 2016/0157660 | A1* | 6/2016 | Rivera | A47J 31/0689 |
| | | | | 99/323 |
| 2016/0166103 | A1* | 6/2016 | Morse | A47J 31/20 |
| | | | | 99/297 |
| 2016/0262564 | A1* | 9/2016 | Scott | A47G 19/16 |
| 2017/0280926 | A1* | 10/2017 | Khalifa | B65D 85/72 |
| 2017/0360240 | A1* | 12/2017 | Morse | A47J 31/20 |
| 2018/0192809 | A1* | 7/2018 | Harper | A47J 31/043 |
| 2018/0263253 | A1 | 9/2018 | Shaw | |
| 2023/0371732 | A1* | 11/2023 | Merrigan | A47J 31/005 |

FOREIGN PATENT DOCUMENTS

| | | | | |
|---|---|---|---|---|
| CN | 101683238 | A | 3/2010 | |
| CN | 206261465 | U | 6/2017 | |
| CN | 109527996 | A | 3/2019 | |
| CN | 110664245 | A | 1/2020 | |
| JP | 2014073229 | A * | 4/2014 | A47J 41/02 |
| TW | M560264 | U | 5/2018 | |

OTHER PUBLICATIONS

Dec. 27, 2019 Written Opinion issued in International Patent Application No. PCT/CN2019/109903.

European Search Report of European Patent Application No. 19900422.7 issued on Nov. 15, 2022.

* cited by examiner

MANUAL PRESSURE TYPE COFFEE MAKER

FIELD OF THE INVENTION

The invention relates to a manual pressure type coffee maker.

BACKGROUND OF THE INVENTION

There are many manual coffee makers on the market, which generally include an outer cup and an inner cup, the inner cup is provided with a squeezing rod which can squeeze the coffee in the inner cup into the outer cup, in this way, the liquid is directly squeezed without forming air pressure. The pressure during squeeze is not easy to control, the coffee obtained has a bad taste, and the coffee powder is easy to be squeezed into the outer cup.

SUMMARY OF THE INVENTION

The purpose of the invention is to overcome the shortcomings in the prior art and provide a manual pressure type coffee maker with simple structure and convenient operation, which can make coffee by forming negative air pressure.

In order to solve the above problems, the invention adopts the following technical solutions:

A manual pressure type coffee maker, comprising an outer cup body, the outer cup body is provided with a cup cavity with an open end, and the outer cup body is provided with an inner container that can be inserted into and pulled out of the cup cavity from the open end, wherein the inner container is provided with at least an inner container cavity for containing brewing materials, the inner container is provided with at least a sealing ring that separates the cup cavity to form a closed space, and a bottom of the inner container cavity is provided with at least a filter communicated with the closed space, when the inner container is pulled outwards, negative pressure is formed in the closed space so that liquid in the inner container cavity is sucked into the closed space through the filter.

In the manual pressure type coffee maker, the outer cup body is provided with a driving device which can drive the inner container to be pulled out of the outer cup body.

In the manual pressure type coffee maker, an outer wall of the inner container is provided with external threads, the driving device is a ring sleeve disposed on the outer cup body and sleeved outside the inner container, and the ring sleeve is provided with internal threads matched for connection with the external threads.

In the manual pressure type coffee maker, an upper end of the inner container is provided with an end extending out of the outer cup body, external diameter of the end is larger than external diameter of the outer cup body, and the driving device is disposed between the end and the open end of the outer cup body.

In the manual pressure type coffee maker, the upper end of the inner container is opened, and the open end of the inner container is provided with a cover, and at least a leak-proof rubber ring is disposed between the cover and the inner container.

In the manual pressure type coffee maker, a bottom wall of the inner container is provided with at least an opening in communication with the cup cavity, and the filter is pressed against the bottom wall of the inner container to cover the opening.

In the manual pressure type coffee maker, an outer wall of the bottom of the inner container is provided with at least an annular groove, and the sealing ring is disposed in the annular groove.

In the manual pressure type coffee maker, a bottom surface of the outer cup body is provided with an anti-slip protection.

In the manual pressure type coffee maker, the filter is in sheet shape.

In the manual pressure type coffee maker, the filter is a component, and the component comprises a cup body disposed at the bottom of the inner container cavity for containing coffee powder, and an upper end and a lower end of the cup body are respectively provided with at least an upper filter and at least a lower filter.

In the manual pressure type coffee maker, a bottom end of the cup body is provided with at least a gravity block below the lower filter, and the gravity block is separated from a bottom surface of the cup body for liquid outflow.

In the manual pressure type coffee maker, at least a filter sealing ring is disposed outside a bottom of the cup body, and a bottom end of the filter sealing ring is pressed against a bottom wall of the inner container cavity.

In the manual pressure type coffee maker, the upper end of the cup body is provided with an upper filter frame, the upper filter is disposed on the upper filter frame, and at least a filter frame sealing ring is disposed between the upper filter frame and the cup body.

In the manual pressure type coffee maker, the cup body is in threaded connection with the bottom of the inner container cavity.

In the manual pressure type coffee maker, the upper end and the lower end of the cup body are respectively provided with an upper filter frame and a lower filter frame, the upper filter is disposed on the upper filter frame, and the lower filter is disposed on the lower filter frame, at least a filter frame sealing ring is respectively disposed between the upper filter frame and the cup body and between the lower filter frame and the cup body.

In the manual pressure type coffee maker, the bottom end of the inner container cavity is opened, and the cup body extends from the bottom opening of the inner container cavity and is in threaded connection with the inner container cavity.

Beneficial effects of the invention: The coffee material is put in the inner container, when the inner container is pulled outwards, the closed space is increased, and negative pressure is formed in it, coffee liquid in the inner container cavity is sucked into the closed space, and the coffee in the cup cavity can be drunk after the inner container is pulled out. Brewing coffee by air pressure, the structure is simple and the operation is convenient. By setting a driving device to drive the inner container, the operation is more convenient. The bottom wall is provided with an opening, and the filter covers the opening and presses against the bottom wall of the inner container, so as to facilitate the disassembling and cleaning of the filter. The filter is a component, so that coffee powder can be placed in the filter, the coffee powder is not in the inner container and is easy to clean. The bottom of the cup body is provided with at least a gravity block, which can prevent the filter component from floating.

DETAILED DESCRIPTION OF THE INVENTION

The invention is further described in detail below in conjunction with the drawings and specific embodiments.

Figure 1:
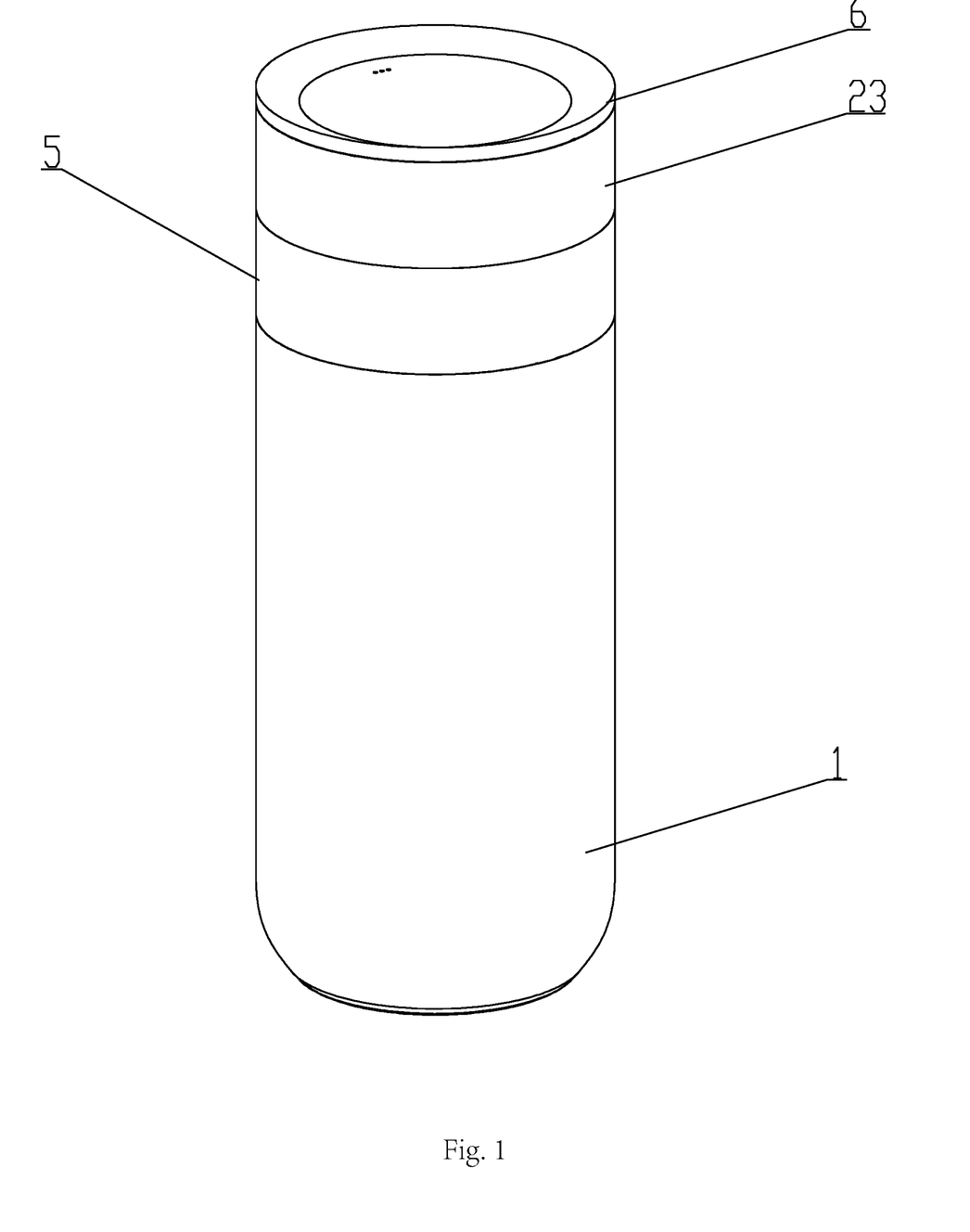
FIG. 1 is a perspective view of the embodiment 1 of the invention.
Figure 2:
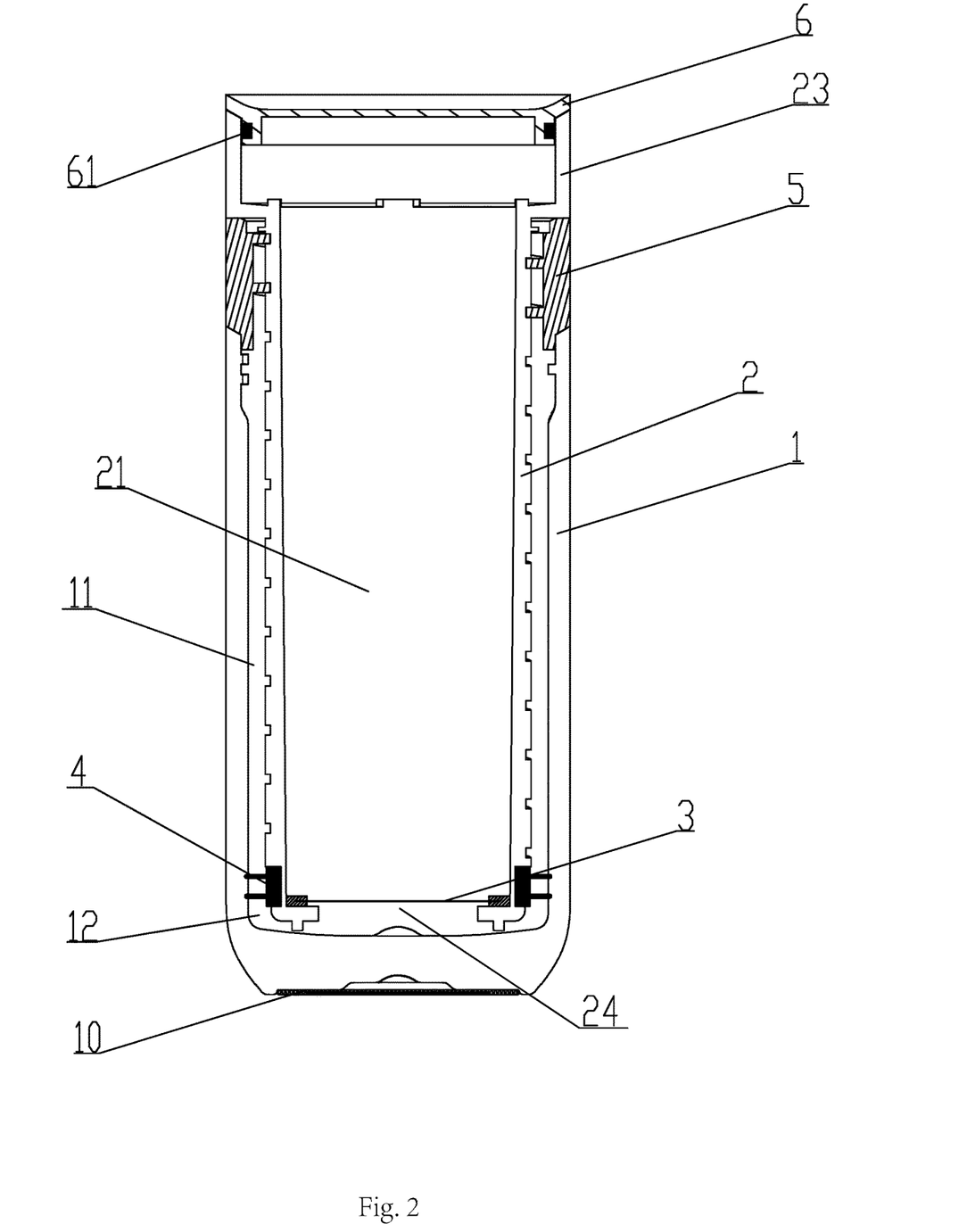
FIG. 2 is a sectional view of the embodiment 1 of the invention.
Figure 3:
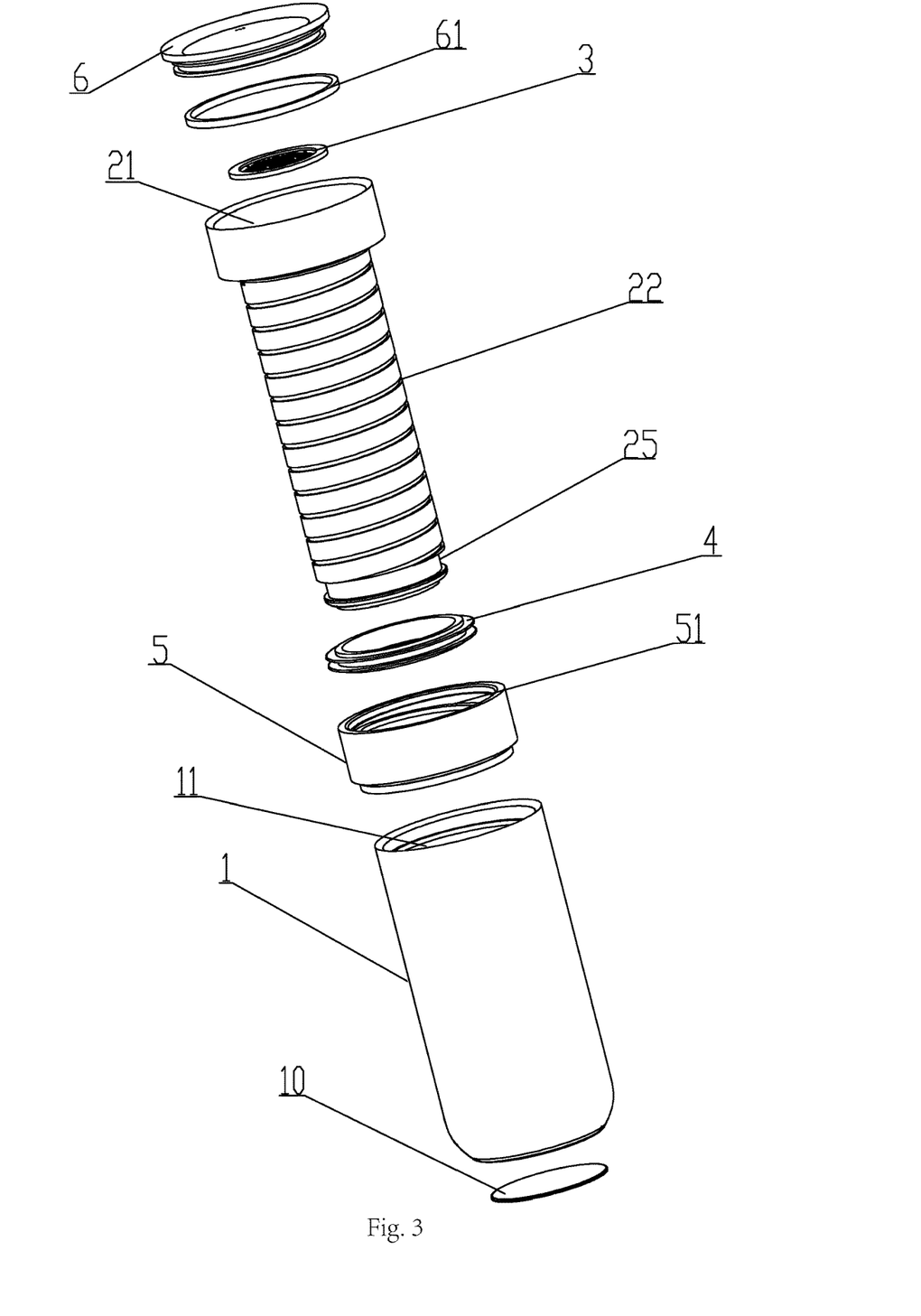
FIG. 3 is an exploded view of the embodiment 1 of the invention.
Figure 4:
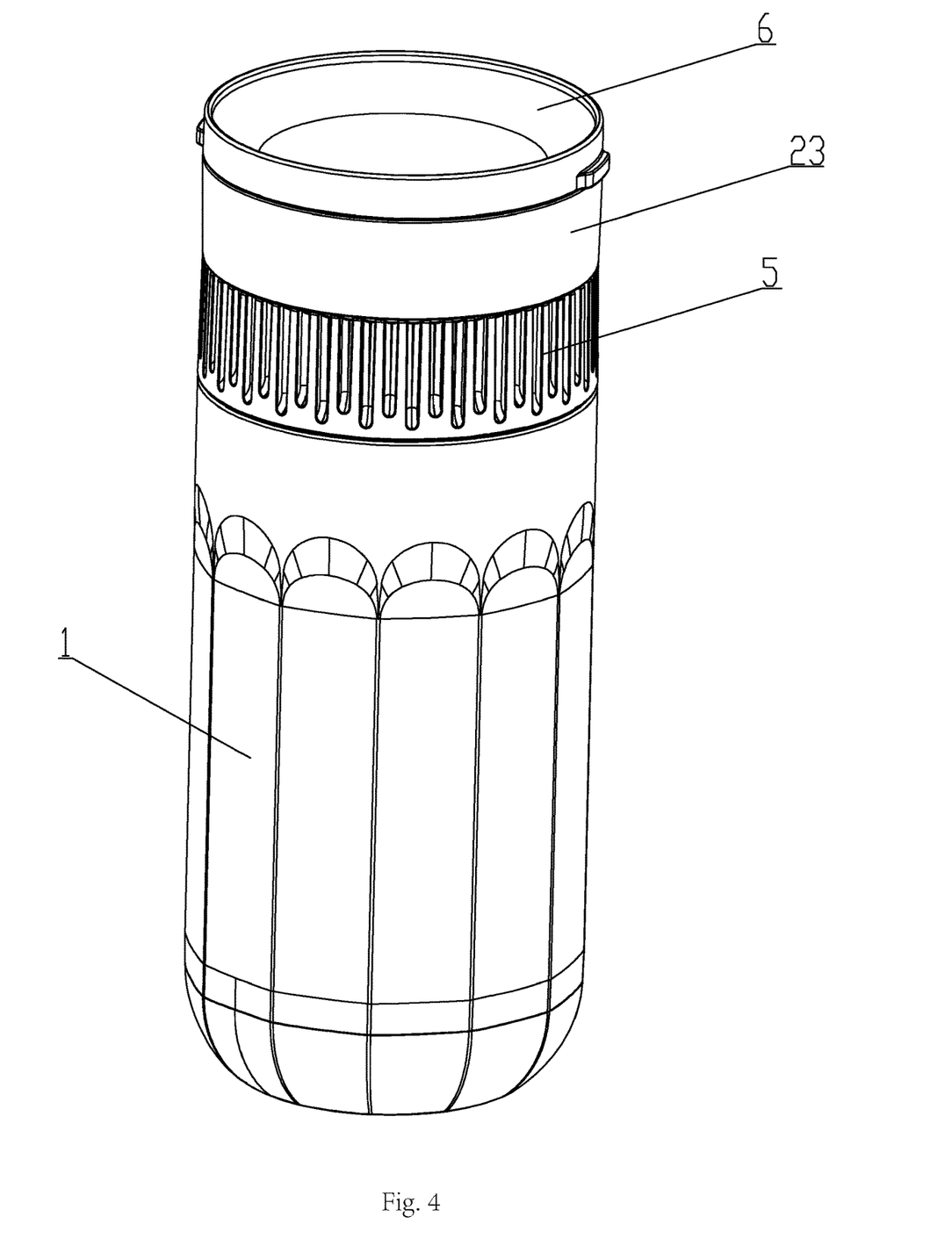
FIG. 4 is a perspective view of the embodiment 2 of the invention.
Figure 5:
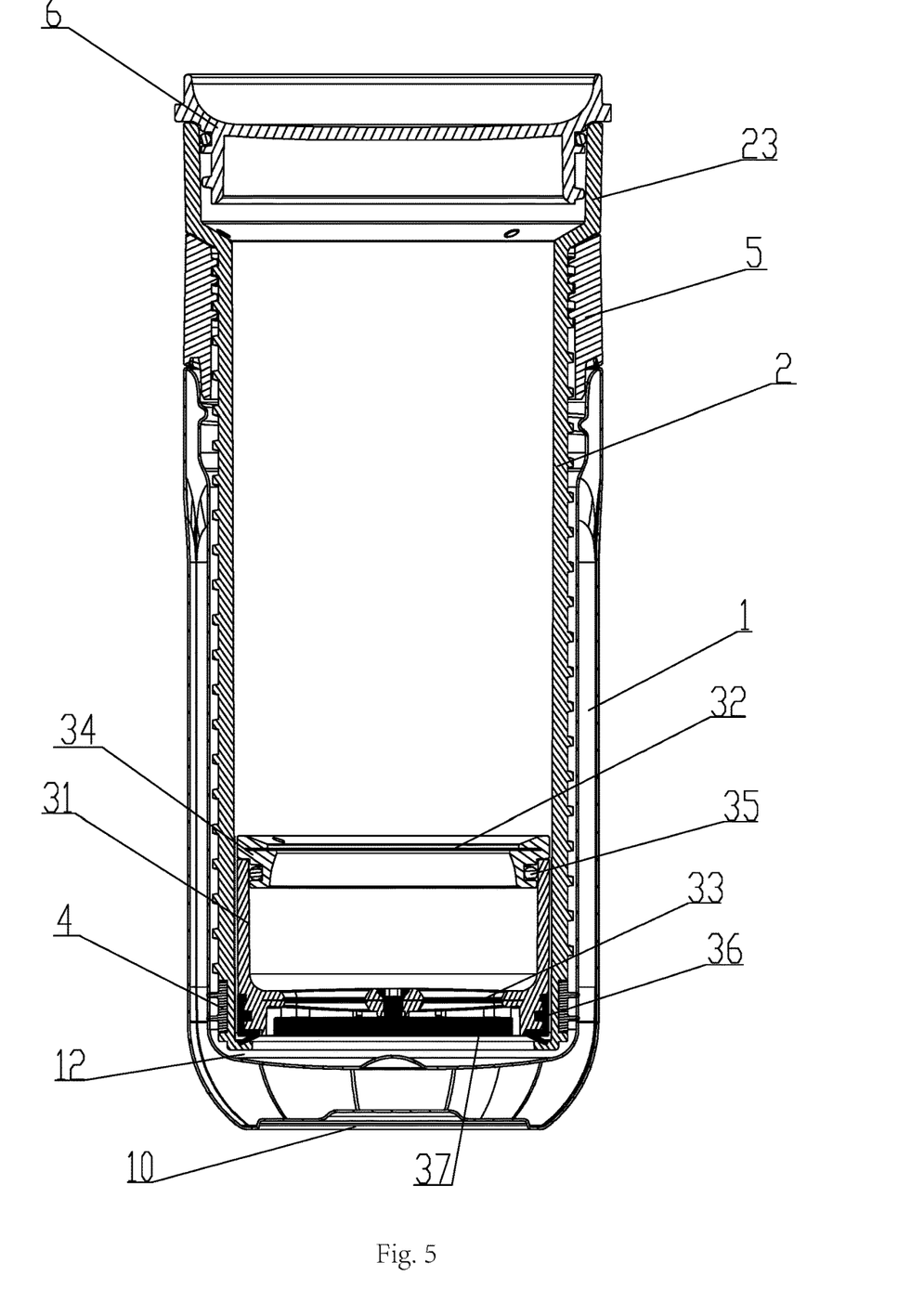
FIG. 5 is a sectional view of the embodiment 2 of the invention.
Figure 6:
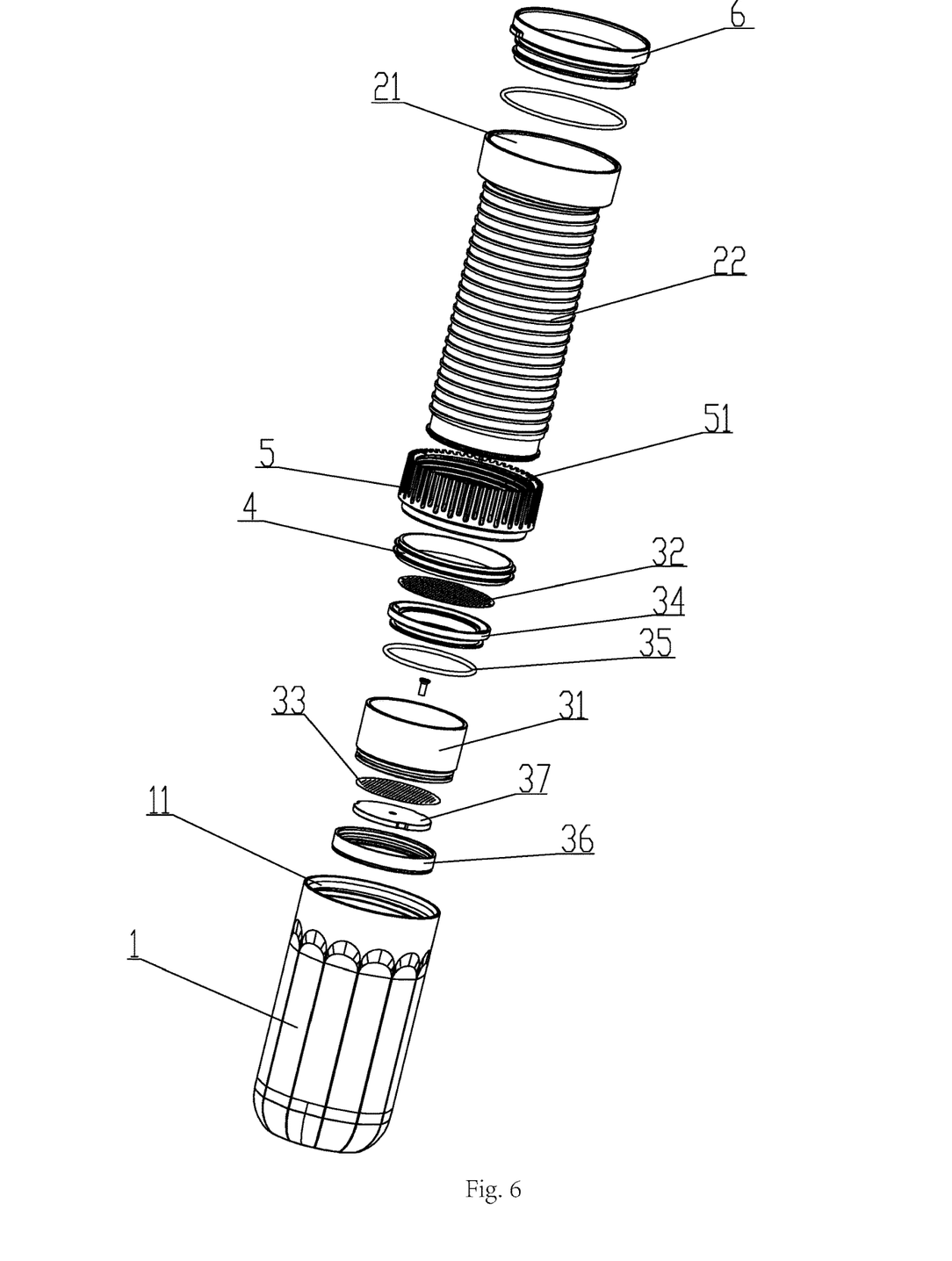
FIG. 6 is an exploded view of the embodiment 2 of the invention.
Figure 7:
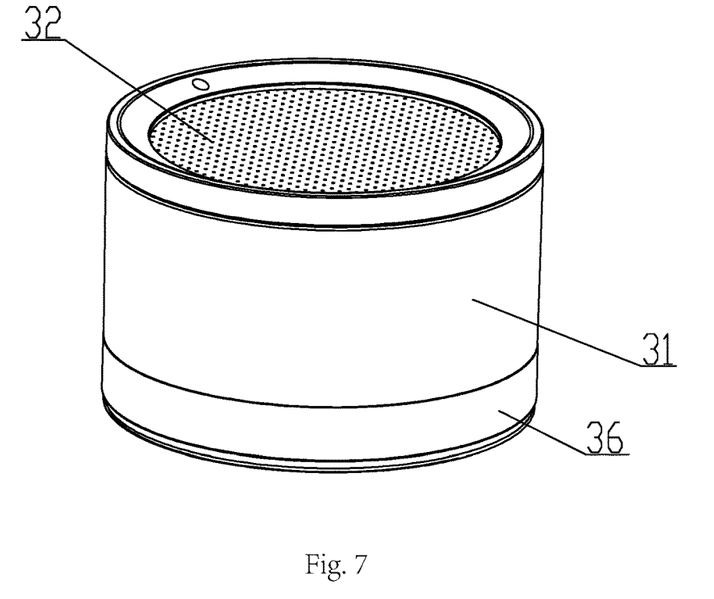
FIG. 7 is a perspective view of the component of the embodiment 2 of the invention.
Figure 8:
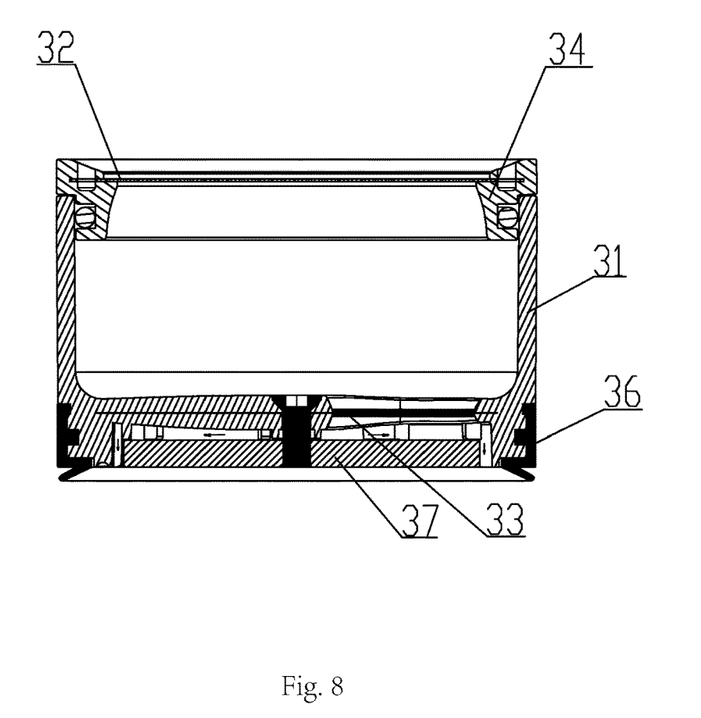
FIG. 8 is a sectional view of the component of the embodiment 2 of the invention.
Figure 9:
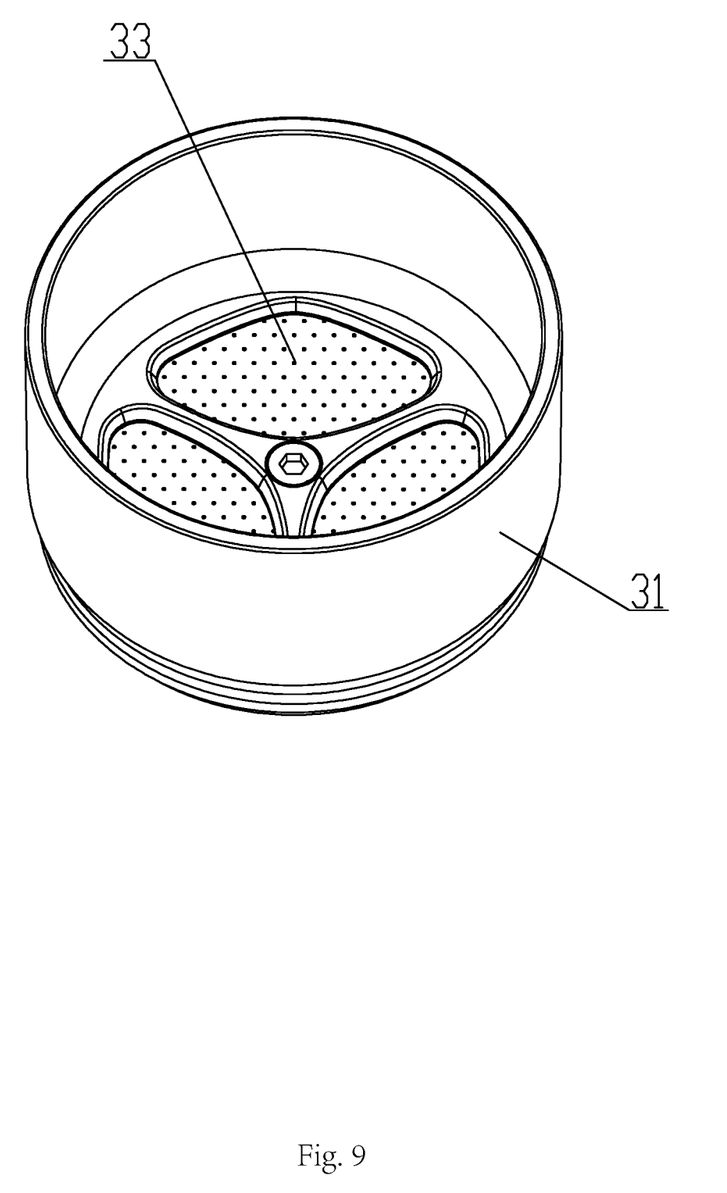
FIG. 9 is a perspective view of the cup body of the embodiment 2 of the invention.
Figure 10:
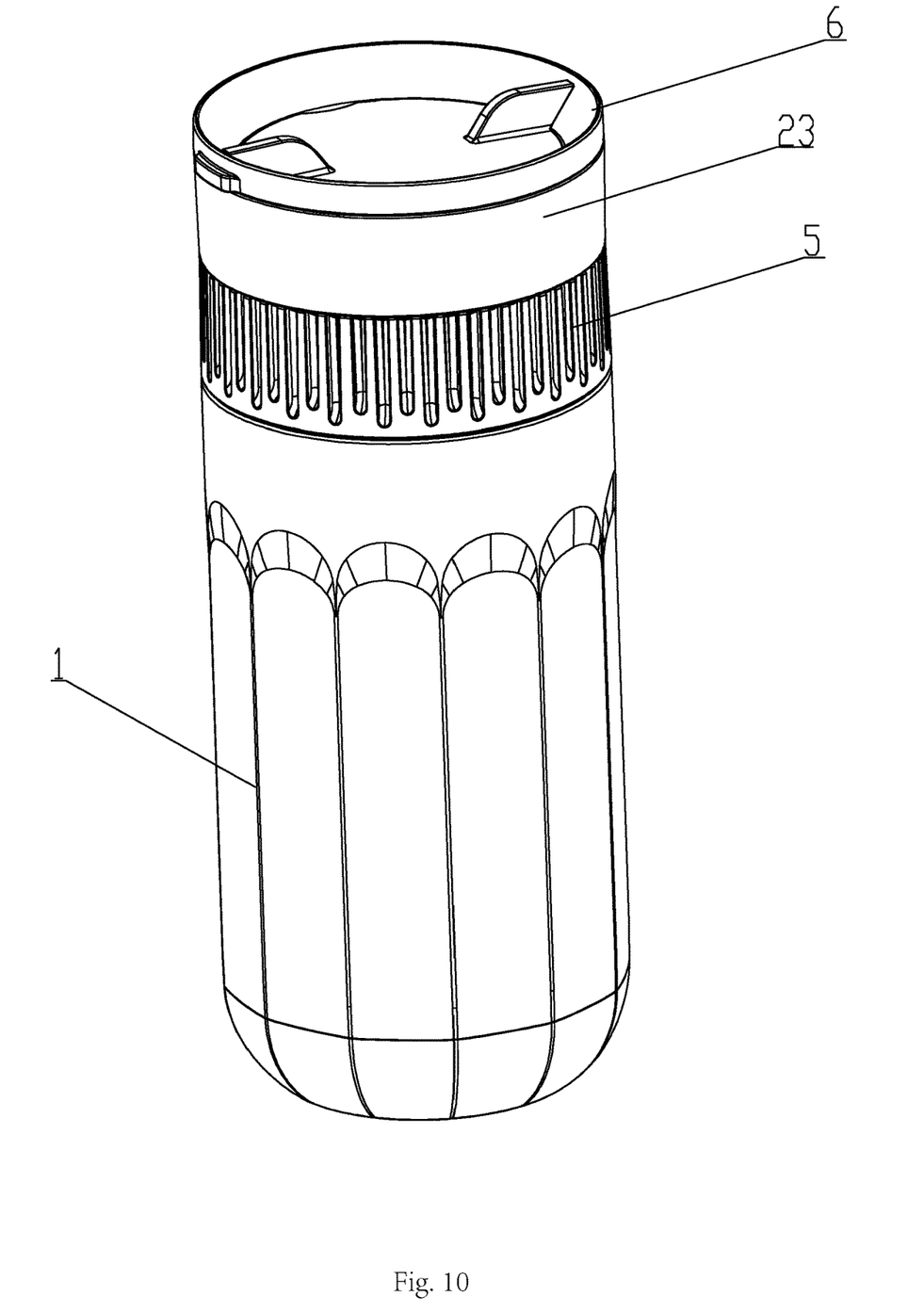
FIG. 10 is a perspective view of the embodiment 3 of the invention.
Figure 11:
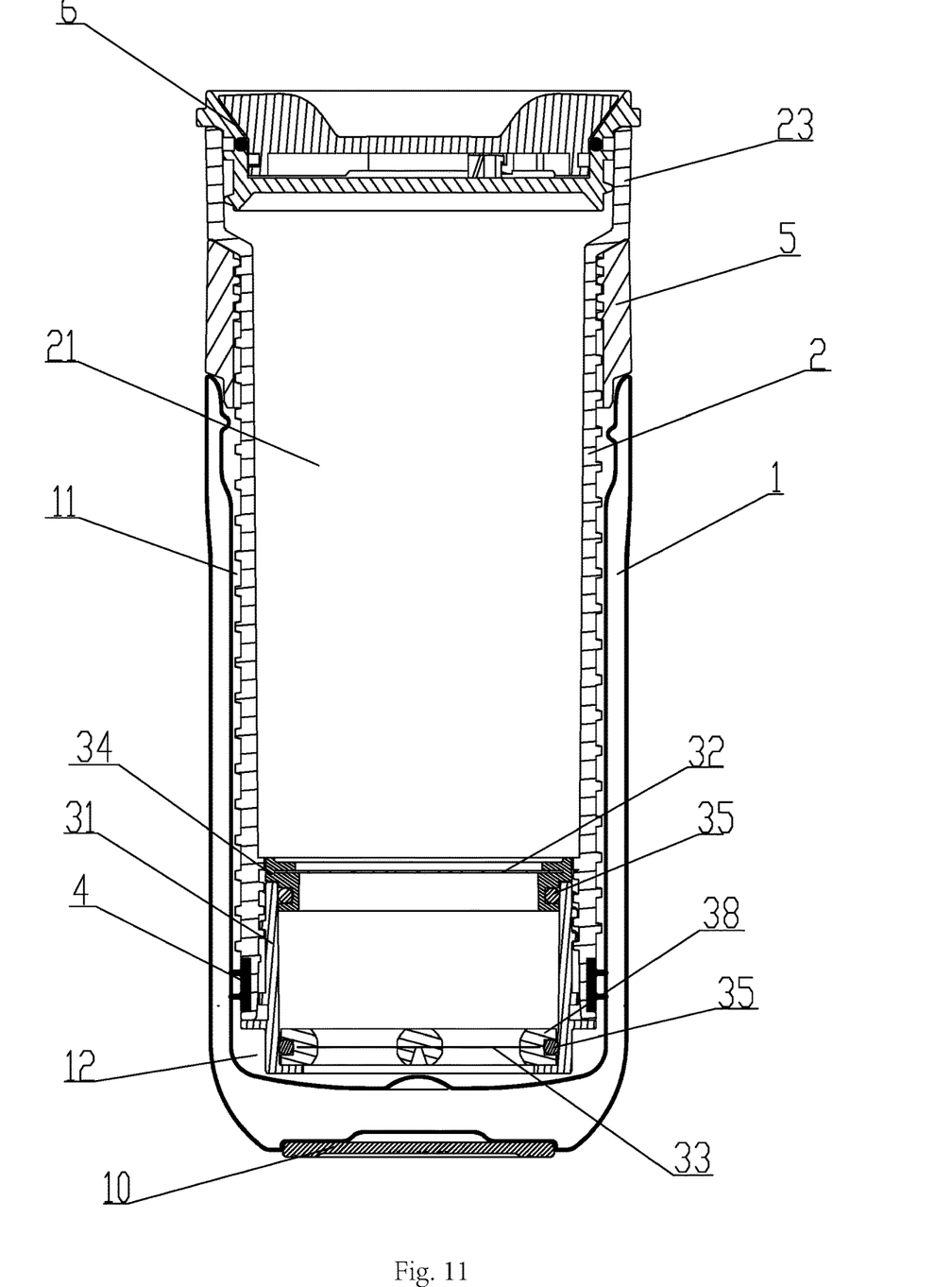
FIG. 11 is a sectional view of the embodiment 3 of the invention.
Figure 12:
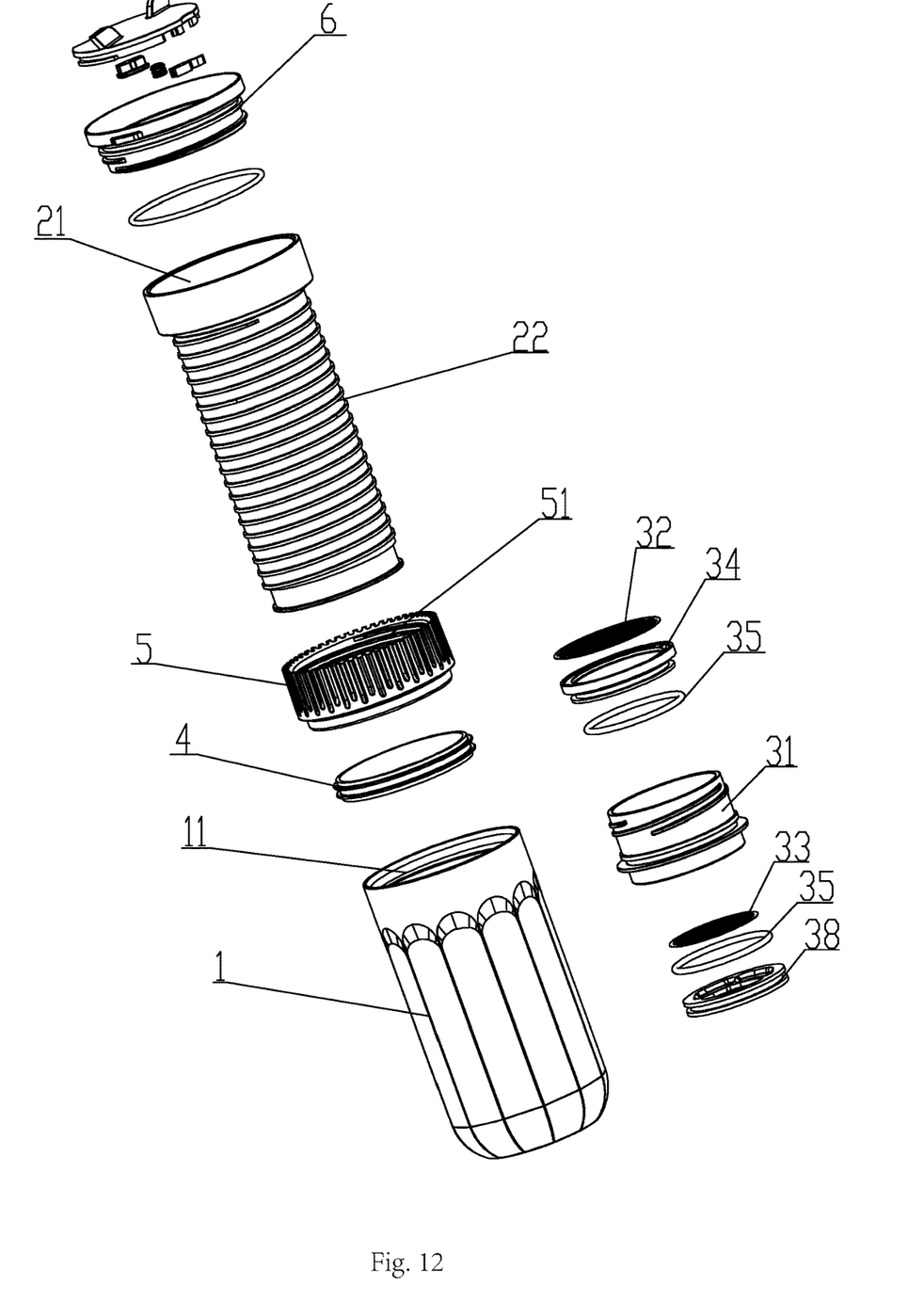
FIG. 12 is an exploded view of the embodiment 3 of the invention.
Figure 13:
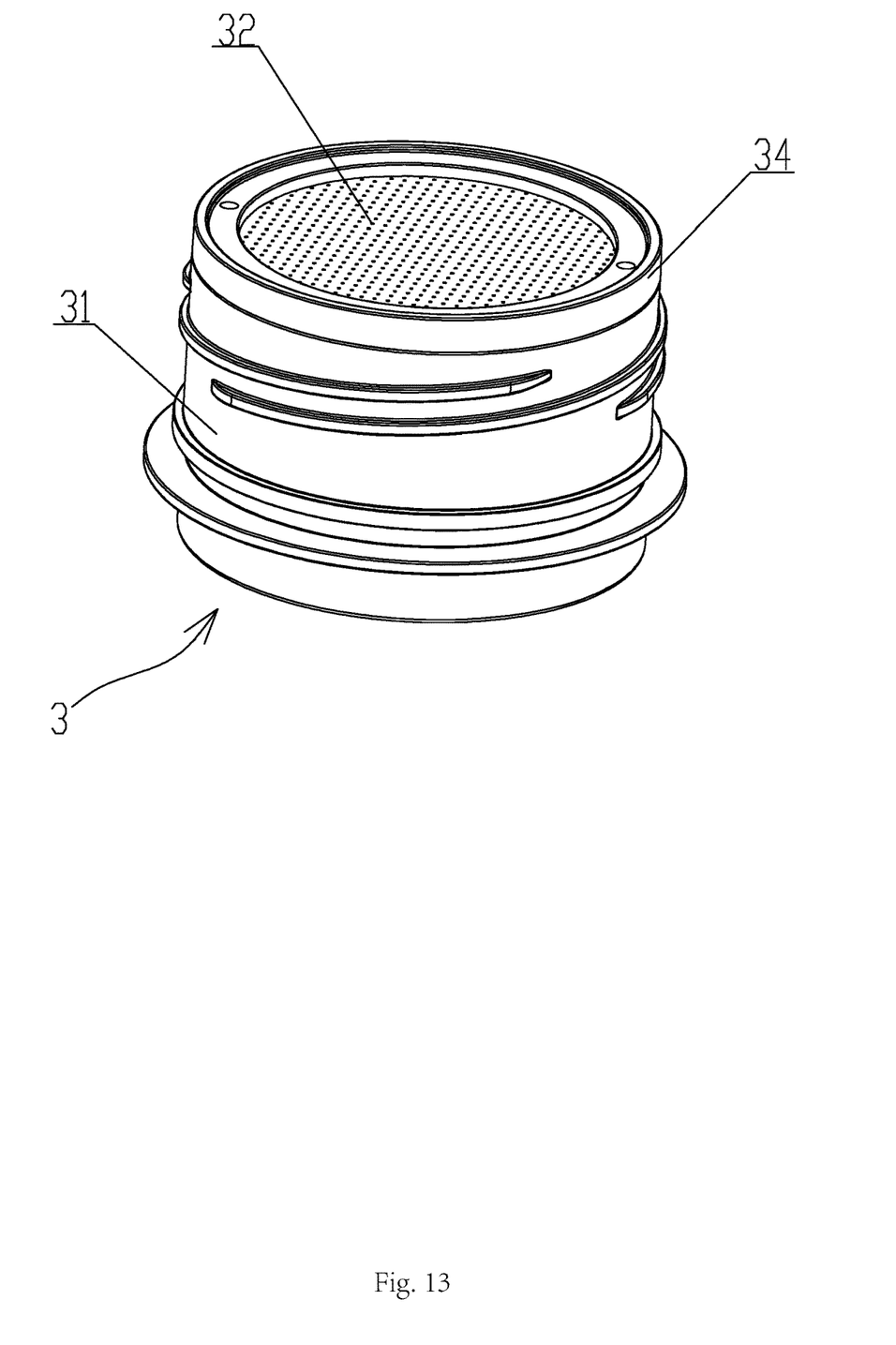
FIG. 13 is a perspective view of the component of the embodiment 3 of the invention.

Embodiment 1: As shown in FIG. 1 to FIG. 3, a manual pressure type coffee maker, comprising an outer cup body 1, a bottom surface of the outer cup body 1 is provided with an anti-slip protection 10, the out cup body 1 can be a thermos cup, the outer cup body 1 is provided with a cup cavity 11 with an open end, and the outer cup body 1 is provided with an inner container 2 that can be inserted into and pulled out of the cup cavity 11 from the open end, one end of the inner container 2 is inserted into the cup cavity 11 and can be pulled out. An upper end of the inner container 2 is opened, and the open end of the inner container 2 is provided with a cover 6, and at least a leak-proof rubber ring 61 is disposed between the cover 6 and the inner container 2, after closing the cover 6, the entire coffee maker forms a cylindrical cup. The inner container 2 is provided with an inner container cavity 21 for containing brewing materials, the brewing materials can be water, coffee, tea, etc., and the form of coffee can be coffee powder, coffee bag, coffee capsule, etc. The inner container 2 is provided with at least a sealing ring 4 that separates the cup cavity 11 to form a closed space 12, after the inner container 2 is inserted into the cup cavity 11, the cup cavity 11 is separated into an upper space and a lower space by the sealing ring 4, and the lower space is the closed space 12, an outer wall of the bottom of the inner container 2 is provided with at least an annular groove 25, and the sealing ring 4 is disposed in the annular groove 25, the function of the sealing ring 4 is equivalent to a piston ring, and the inner container 2 can be equivalent to a piston rod, when the inner container 2 is pulled outwards, the volume of the closed space 12 becomes larger, thus forming a negative pressure. And the closed space 12 is defined as the space without a large opening. The bottom of the inner container cavity 21 is provided with at least a filter 3 communicated with the closed space 12, the filter 3 is in sheet shape, that is, a sheet-like block, and its thickness is about 1-10 mm, the filter 3 has small meshes that allows liquid to pass through, but the coffee grounds cannot pass through. When water is poured into the inner container cavity 21, the closed space 12 is basically in a closed state. When the inner container 2 is pulled outwards, a negative pressure is formed in the closed space 12 so that the liquid in the inner container cavity 21 is sucked into the closed space 12 through the filter 3, so that coffee is finally in the outer cup body 1.

The inner container 2 can be pulled out manually, of course, which is not the best way. The best way is to provide a driving device 5 on the outer cup body 1 that can drive the inner container 2 to be pulled out of the outer cup body 1. Specifically, an outer wall of the inner container 2 is provided with external threads 22, the driving device 5 is a ring sleeve disposed on the outer cup body 1 and sleeved outside the inner container 2, and the ring sleeve is provided with internal threads 51 matched for connection with the external threads 51. An upper end of the inner container 2 is provided with an end 23 extending out of the outer cup body 1, external diameter of the end 23 is larger than external diameter of the outer cup body 1, and the driving device 5 is disposed between the end 23 and the open end of the outer cup body 1. The upper end of the driving device 5 is at the lower end of the end 23, and the lower end of the driving device 5 is supported on the open end of the outer cup body 1. When the ring sleeve is rotated manually, the ring sleeve does not rise, and the inner container 2 is driven upward, thereby the closed space 12 is increased and the air pressure is reduced. An bottom wall of the inner container 2 is provided with an opening 24 in communication with the cup cavity 11, and the filter 3 is pressed against the bottom wall of the inner container 2 to cover the opening 24, the filter 3 is pressed against the side wall of the inner container cavity 21 through an interference fit, or a rubber ring is sleeved outside the filter 3, and the filter is pressed against the side wall of the inner container cavity 21 by the rubber ring to facilitate the removal of the filter 3 for cleaning.

When in use, put the inner container 2 into the outer cup body 1, pour coffee into the inner container cavity 21, and pour water into the inner container cavity 21 to brew coffee, and then rotate the ring sleeve to make the inner container cavity 21 move upward to form a negative pressure in the closed space 12, coffee liquid in the inner container cavity 21 is sucked into the closed space 12, after the inner container 2 is completely pulled out, the coffee in the outer cup body 1 can be poured out or drunk directly. The structure is simple and the operation is convenient, and coffee produced by air pressure has rich foam and good taste.

Embodiment 2 is shown in FIG. 4 to FIG. 9, and the difference from Embodiment 1 is that the filter 3 is a component, that is, a filter component, when the inner container 2 is pulled outwards, a negative pressure is formed in the closed space 12 so that liquid in the inner container cavity 21 is sucked into the closed space 12 through the filter component, the liquid is water, and the component comprises a cup body 31 disposed at the bottom of the inner container cavity 21 for containing coffee powder, the bottom of the inner container cavity 21 is opened, and the filter component covers the opening of the bottom of the inner container cavity 21. Coffee powder can be forms of bulk coffee powder, coffee pods, coffee capsule, etc. The component comprises a cup body 31 disposed at the bottom of the inner container cavity 21 for containing coffee powder, and an upper end and a lower end of the cup body 31 are respectively provided with at least an upper filter 32 and at least a lower filter 33. The upper end of the cup body 31 is provided with an upper filter frame 34, the upper filter 32 is disposed on the upper filter frame 34, and at least a filter frame sealing ring 35 is disposed between the upper filter frame 34 and the cup body 31, when the cup body 31 is filled with coffee and the upper filter frame 34 is covered, the coffee powder is not easy to enter the inner container cavity 21. The bottom end of the cup body 31 is provided with at least a gravity block 37 below the lower filter 33, the function of the gravity block 37 is to increase the weight of the cup body 31, so that the cup body 31 is not easy to float under the action of water. The gravity block 37 can be a metal block, which can be installed by a screw or screws, and the screw pass through the lower filter 33 and a bottom of the cup body 31, the bottom of the cup body 31 is provided with a plurality of large through holes, and the lower filter 33 is embedded in the bottom of the cup body 31 to cover the through holes, the gravity block is separated from the bottom surface of the cup body 31 for liquid outflow, the gravity block is outside the cup body 31, after liquid in the cup body 31 passes through the lower filter 33, flows out from a space between the gravity block and the bottom of the cup body 31 and enters the closed space12 in the inner container 2. At least a filter sealing ring 36 is arranged outside the bottom of the cup body 31, and a bottom end of the filter sealing ring 36 is pressed against the bottom wall of the inner container cavity 21, after negative pressure is formed in the closed space 12, the cup body 31 is sucked downward through the action of the negative pressure, so that the filter sealing ring 36 is tightly attached to the bottom wall of the inner container cavity 21 to achieve the self-locking sealing.

If coffee capsule is used, since the coffee capsule itself has a filter, the filter of the coffee capsule can be used as a lower filter 33.

When in use, remove the cup body 31 and the upper filter 32, put coffee powder into the cup body 31, cover the upper filter 32, and put the cup body 31 into the inner container cavity 21, and then pour water into the inner container cavity 21, rotate the ring sleeve to make the inner container cavity 21 move upward to form a negative pressure in the closed space 12, water in the inner container cavity 21 enters the cup body 31 through the upper filter 32, after the coffee powder is brewed, coffee liquid enters the closed space 12 through the lower filter 33, after the inner container 2 is completely pulled out, the coffee in the outer cup body 1 can be poured out or drunk directly. The structure is simple and the operation is convenient. Coffee produced by air pressure has rich foam and good taste. When the coffee powder needs to be changed or cleaned, just take out the cup body 31 again.

Embodiment 3 is shown in FIG. 10 to FIG. 13, and the difference from Embodiment 2 is that the installation method of the filter component is different. Specifically, the cup body 31 is in threaded connection with the bottom of the inner container cavity 21, the bottom end of the inner container cavity 21 is opened, and the cup body 31 extends from the opening of the bottom of the inner container cavity 21 and is in threaded connection with the inner container cavity 21. An upper end and a lower end of the cup body 31 are respectively provided with at least an upper filter frame 34 and at least a lower filter frame 38, the upper filter 32 is disposed on the upper filter frame 34, and the lower filter 33 is disposed on the lower filter frame 38, at least a filter frame sealing ring 35 is respectively disposed between the upper filter frame 34 and the cup body 31 and between the lower filter frame 38 and the cup body 31, easy installation through threaded connection. If coffee capsule is used, since the coffee capsule itself has a filter, the filter of the capsule coffee can be used as an upper filter 32 or a lower filter 33.

What is claimed:

1. A manual pressure type coffee maker, comprising an outer cup body, the outer cup body is provided with a cup cavity with an open end, and the outer cup body is provided with an inner container that can be inserted into and pulled out of the cup cavity from the open end, wherein the inner container is provided with at least an inner container cavity for containing brewing materials, the inner container is provided with at least a sealing ring that separates the cup cavity to form a closed space, and a bottom of the inner container cavity is provided with at least a filter communicated with the closed space, when the inner container is pulled outwards, negative pressure is formed in the closed space so that liquid in the inner container cavity is sucked into the closed space through the filter;

wherein the outer cup body is provided with a driving device which can drive the inner container to be pulled out of the outer cup body; and wherein an outer wall of the inner container is provided with external threads, the driving device is a ring sleeve disposed on the outer cup body and sleeved outside the inner container, and the ring sleeve is provided with internal threads matched for connection with the external threads.

2. The manual pressure type coffee maker according to claim 1, wherein an upper end of the inner container is provided with an end extending out of the outer cup body, external diameter of the end is larger than external diameter of the outer cup body, and the driving device is disposed between the end and the open end of the outer cup body.

3. The manual pressure type coffee maker according to claim 1, wherein the upper end of the inner container is opened, and the open end of the inner container is provided with a cover, and at least a leak-proof rubber ring is disposed between the cover and the inner container.

4. The manual pressure type coffee maker according to claim 1, wherein a bottom wall of the inner container is provided with at least an opening in communication with the cup cavity, and the filter is pressed against the bottom wall of the inner container to cover the opening.

5. The manual pressure type coffee maker according to claim 1, wherein an outer wall of the bottom of the inner container is provided with at least an annular groove, and the sealing ring is disposed in the annular groove.

6. The manual pressure type coffee maker according to claim 1, wherein a bottom surface of the outer cup body is provided with an anti-slip protection.

7. The manual pressure type coffee maker according to claim 1, wherein the filter is in sheet shape.

8. The manual pressure type coffee maker according to claim 1, wherein the filter is a component, and the component comprises a cup body disposed at the bottom of the inner container cavity for containing coffee powder, and an upper end and a lower end of the cup body are respectively provided with at least an upper filter and at least a lower filter.

9. The manual pressure type coffee maker according to claim 8, wherein a bottom end of the cup body is provided with at least a gravity block below the lower filter, and the gravity block is separated from a bottom surface of the cup body for liquid outflow.

10. The manual pressure type coffee maker according to claim 8, wherein at least a filter sealing ring is disposed outside a bottom of the cup body, and a bottom end of the filter sealing ring is pressed against a bottom wall of the inner container cavity.

11. The manual pressure type coffee maker according to claim 8, wherein the upper end of the cup body is provided with an upper filter frame, the upper filter is disposed on the upper filter frame, and at least a filter frame sealing ring is disposed between the upper filter frame and the cup body.

12. The manual pressure type coffee maker according to claim 8, wherein the cup body is in threaded connection with the bottom of the inner container.

13. The manual pressure type coffee maker according to claim 12, wherein the upper end and the lower end of the cup body are respectively provided with an upper filter frame and a lower filter frame, the upper filter is disposed on the upper filter frame, and the lower filter is disposed on the lower filter frame, at least a filter frame sealing rings is respectively disposed between the upper filter frame and the cup body and between the lower filter frame and the cup body.

14. The manual pressure type coffee maker according to claim 12, wherein the bottom end of the inner container cavity is opened, and the cup body extends from the bottom opening of the inner container cavity and is in threaded connection with the inner container.

15. A manual pressure type coffee maker, comprising an outer cup body, the outer cup body is provided with a cup cavity with an open end, and the outer cup body is provided with an inner container that can be inserted into and pulled out of the cup cavity from the open end, wherein the inner container is provided with at least an inner container cavity for containing brewing materials, the inner container is provided with at least a sealing ring that separates the cup cavity to form a closed space, and a bottom of the inner container cavity is provided with at least a filter communicated with the closed space, when the inner container is pulled outwards, negative pressure is formed in the closed space so that liquid in the inner container cavity is sucked into the closed space through the filter, wherein the filter is a component, and the component comprises a cup body disposed at the bottom of the inner container cavity for containing coffee powder, and an upper end and a lower end of the cup body are respectively provided with at least an upper filter and at least a lower filter, wherein the upper end of the cup body is provided with an upper filter frame, the upper filter is disposed on the upper filter frame, and at least a filter frame sealing ring is disposed between the upper filter frame and the cup body.

16. A manual pressure type coffee maker, comprising an outer cup body, the outer cup body is provided with a cup cavity with an open end, and the outer cup body is provided with an inner container that can be inserted into and pulled out of the cup cavity from the open end, wherein the inner container is provided with at least an inner container cavity for containing brewing materials, the inner container is provided with at least a sealing ring that separates the cup cavity to form a closed space, and a bottom of the inner container cavity is provided with at least a filter communicated with the closed space, when the inner container is pulled outwards, negative pressure is formed in the closed space so that liquid in the inner container cavity is sucked into the closed space through the filter, wherein the filter is a component, and the component comprises a cup body disposed at the bottom of the inner container cavity for containing coffee powder, and an upper end and a lower end of the cup body are respectively provided with at least an upper filter and at least a lower filter, wherein the cup body is in threaded connection with the bottom of the inner container.

17. The manual pressure type coffee maker according to claim 16, wherein the upper end and the lower end of the cup body are respectively provided with an upper filter frame and a lower filter frame, the upper filter is disposed on the upper filter frame, and the lower filter is disposed on the lower filter frame, at least a filter frame sealing rings is respectively disposed between the upper filter frame and the cup body and between the lower filter frame and the cup body.

18. The manual pressure type coffee maker according to claim 16, wherein the bottom end of the inner container cavity is opened, and the cup body extends from the bottom opening of the inner container and is in threaded connection with the inner container.

* * * * *